United States Patent
Reznik et al.

(10) Patent No.: US 6,304,080 B1
(45) Date of Patent: Oct. 16, 2001

(54) SYSTEM FOR VERIFYING THE LOCATION OF A PLURALITY OF PHYSICAL FEATURES RELATIVE TO MAGNETIC POLES ARRANGED ON A COMPLEX MAGNETIC ELEMENT

(75) Inventors: Svetlana Reznik; Gary R. Kenny, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/419,848

(22) Filed: Oct. 19, 1999

(51) Int. Cl.$^7$ ........................................ G01B 7/14
(52) U.S. Cl. .................. 324/207.25; 324/207.22; 324/262
(58) Field of Search ............ 324/207.2, 207.22, 324/207.23, 207.25, 226, 262

(56) References Cited

PUBLICATIONS

Research Disclosure No. 37841, Oct. 1995.

Primary Examiner—Walter E. Snow
(74) Attorney, Agent, or Firm—Clyde E. Bailey, Sr.

(57) ABSTRACT

A system for verifying the location of physical features on complex magnetic elements, such as magnetic rotors, for driving an electrostatic shutter. A magnetic rotor of the type measured by the magnetic measuring apparatus of the invention has a plurality of magnetic poles and physical features arranged thereon. Each one of both the magnetic poles and physical features has a spatial and magnetic field relative to one another which is rapidly measured by the magnetic measuring apparatus using a dual probe Gaussmeter and encoder means operably connected to a data comptroller.

6 Claims, 7 Drawing Sheets

SYSTEM FOR VERIFYING THE LOCATION OF A PLURALITY OF PHYSICAL FEATURES RELATIVE TO MAGNETIC POLES ARRANGED ON A COMPLEX MAGNETIC ELEMENT

CROSS-REFERENCE TO RELATED APPLICATIONS

The present application is related to U.S. Application Ser. No. 09/420,825, filed Oct. 19, 1999, by Svetlana Reznik and Gary R. Kenny, and entitled, "Method Of Inspecting A Complex Magnetic Element;" and U.S. Application Ser. No. 09/420,828, filed Oct. 19, 1999, by Svetlana Reznik and Gary R. Kenny, and entitled, "Apparatus For Testing Complex Magnetic Elements."

FIELD OF THE INVENTION

The invention relates generally to the field of magnetic field measuring systems. More particularly, the invention concerns a system capable of verifying the location of physical features on a complex magnetic element such as miniature multi-pole, high energy, magnetic rotors that drives electromagnetic camera shutter actuators.

BACKGROUND OF THE INVENTION

Miniature bipolar cylindrical magnets are used as the drive element (rotor) in electromagnetic components such as electromagnetic camera shutter actuators. To ensure proper and reliable shutter performance, the polarization (operating point) and orientation of the magnets need to be controlled to a high degree of accuracy. However, during the mass production of these magnets significant variations occur in both of these characteristics. These variations are due to non-uniformity's of the bulk materials from which the magnets are cut and from variations in the magnetizing field strength over the group of magnets that are bulk magnetized. Moreover, experience indicates that it is difficult, if not impossible, to eliminate both of these causes.

There have been several attempts to provide an apparatus and method for rapidly determining de magnetization and orientation for purposes of selecting only those magnets that have acceptable values.

Referring to FIG. 1, one such existing apparatus 1, disclosed in Research Disclosure No. 37841, dated October 1995, comprises a rectangular ferromagnetic core 11 with two gap regions 2 and 3. A field sensor 4 is positioned in gap region 3 that is connected to a Gaussmeter 5, and a first angular meter device 6. First angular meter device 6 further comprises a first needle pointer 7 connected to a first support member 8 that is mounted for rotation about a pivot axis 9, and a marked scale 10 for determining the angular deflection of the first needle pointer 7 from the vertical straight up position (illustrated in FIG. 1). The ferromagnetic core 11 and the first angular meter device 6 are mounted on a frame 12 that is constructed from a non-magnetic material such as aluminum. The core 11 is fixed to the frame 12 whereas the first angular meter device 6 is mounted for translation along the frame 12 as indicated by the solid arrow in FIG. 1.

Referring to FIG. 2, a second prior art apparatus 14 (also disclosed in the above referenced Research Disclosure) for rapidly determining the orientation of miniature bipolar magnets for purposes of selection for assembly is illustrated. According to FIG. 2, the apparatus 14 comprises a second angular meter device 16 that is mounted for linear translation relative to a stationary member 18. The second angular meter device 16, made from non-magnetic material, comprises a second needle pointer 20 connected to a second support member 22 that is mounted for rotation about a pivot axis 24. As shown in FIG. 2, second angular metering device 16 further includes a marked scale 26 for determining the angular deflection of the second needle pointer 20 from its detent position. The second support member 22 which is mounted for rotation has a top portion (not shown) that is designed to hold a miniature bipolar magnet that is to be tested. The stationary member 18 is made from non-magnetic steel and comprises a base 28, and support structure 30 which supports two ferromagnetic pole pieces 32a and 32b that are in a spaced-apart relation. The second angular meter device 16 is mounted for translation as indicated by the dotted arrow in FIG. 2.

Referring again to FIG. 1, an existing method for evaluating the polarization and orientation of miniature bipolar magnets 40 include the step of initially providing first angular meter device 6 in position A, separated from core 11. A miniature bipolar cylindrical magnet 40 is mounted on first support member 8 of first angular meter device 6 with its "anticipated" north pole 40a vertically up. In this initial position, first needle pointer 7 is straight up indicating 0 degrees of deflection on the marked scale 10. The first angular meter device 6 is then moved to position B as illustrated until the magnet 40 is symmetrically positioned in gap region 2 of core 11. The magnet 40 will then align itself in the gap 2 so that its "true" north pole 40a is symmetrically positioned with respect to tapered pole tip 2a. If the "true" north pole 40a is offset in an angular sense from the "anticipated" north pole, the magnet 40 will rotate and first needle pointer 7 will deflect indicating the angular offset on the marked scale 10. In this way, the orientation of the magnet 40 is determined. Once the magnet 40 has oriented itself, it comes to rest. In its rest position, the flux from the magnet 40 passes through the core 11 and is directed through gap region 3 where the field sensor 4 is located. The field through the sensor 4 is registered on Gaussmeter 5. This registered field value is compared to a calibration field value from a known magnet. In this way, the magnetization of the magnet 40 is determined. Depending on the results of the test, the magnet 40 is either accepted or rejected.

A shortcoming of the aforementioned existing apparatus and method for screening bipolar magnets 40 is that they do not have the ability to verify manufacturing variability and magnetization in complex magnetic rotors. More importantly, existing apparatus and methods, as described above, do not have the ability to compare magnetic flux density of a magnet with angular position or angular position of certain post features with reference to magnetic poles. Moreover, existing models do not have the ability to display acquired data and then compare such data with predetermined calibrated complex magnetic elements, such as magnetic rotors.

Therefore, a need persists in the art for a measurement apparatus and method that can generate specific magnetic flux and angular position data of bipolar miniature magnets for determining their acceptability for use in electromagnetic components, such as high speed shutter applications.

SUMMARY OF THE INVENTION

It is, therefore, an object of the invention to provide a system capable of verifying manufacturing variability and magnetization in complex magnetic elements, such as magnetic rotors for driving electromagnetic components.

It is another object of the invention to provide a system that correlates physical features to angular positions of magnetic poles arranged on a complex magnetic element, such as a magnetic rotor.

Still another object of the invention is to provide a system that produces and displays multiple data arrays including relative angular positions of each point, magnetic pole flux density and post magnetic flux density.

Yet another object of the invention is to provide a system that simultaneously measures the radial components of a magnetic field even when spatial separation between magnetic poles is less than 1 mm, and the magnetic element has a complicated 3-dimensional shape.

Yet another object of the invention is to provide a system that can produce measurement results in a relatively short time.

The present invention is directed to overcoming one or more of the problems set forth above. Briefly summarized, according to one aspect of the present invention, a system measures magnetic properties of each one of a plurality of magnetic poles and each one of a plurality of physical features arranged on a complex magnetic element having a fixed reference feature thereon. The system includes means for rotating the magnetic element so as to continuously expose each one of the plurality of magnetic poles and each one of the plurality of physical features to a measurement of magnetic flux. An encoder means, operably connected to the means for rotating, generates a first signal corresponding to an angular position of each one of the plurality of magnetic poles relative to a predetermined one of the plurality of physical features. In this application of the system, angular position defines the location of the predetermined physical feature. Means for measuring magnetic flux is positioned proximate to the magnetic element. Important to the present invention, the means for measuring has a first and second magnetic flux measuring probe. The first magnetic flux probe, when in contact with the rotating magnetic element, as described, generates a plurality of second signals each one of which corresponds to a first magnetic flux value associated with each one of the magnetic poles. Similarly, the second magnetic flux measuring probe generates a plurality of third signals each one of which corresponds to a second magnetic flux value associated with each one of the plurality of physical features. Finally, a data controller, in operable connection with both the encoder means and means for measuring magnetic flux, acquires and then analyzes the first, second and third signals.

Therefore, the measurement system of the present invention has several important advantages over current development. In the first instance, the system of the invention is a unique spatial non-predictive magnetic field measurement device unlike existing apparatus. Further, it correlates physical rotor features relative to the magnetic pole position. Also, it provides an isometric visual display of magnetic field. Moreover, it simultaneously measures the radial components of a magnetic field even when distance between poles are less than 1 mm, and magnetized rotor has a complicated 3-D shape. Still further, it provides easy data storage and retrieval in color hardcopy printout. The present invention provides rapid measurement results in just a few minutes.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
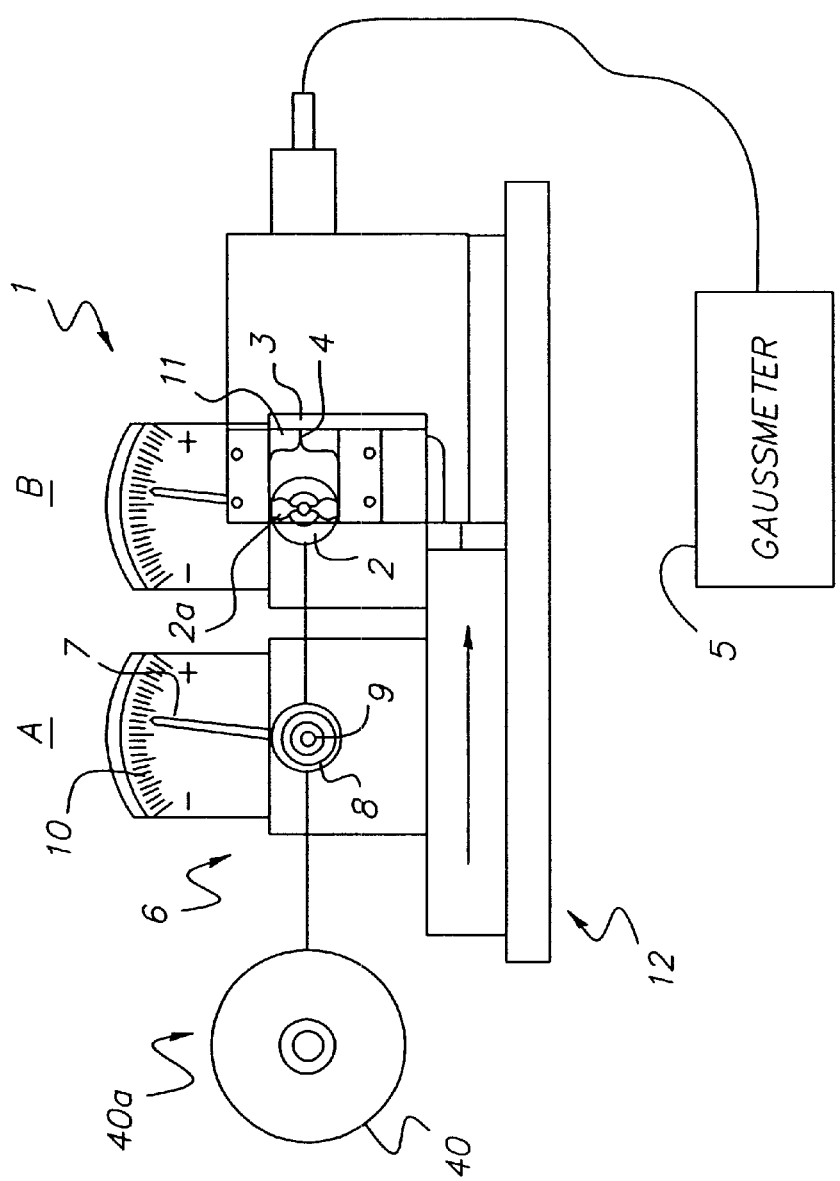
FIG. 1 is a prior art apparatus for evaluating the polarization and orientation of miniature bipolar magnets.
Figure 2:
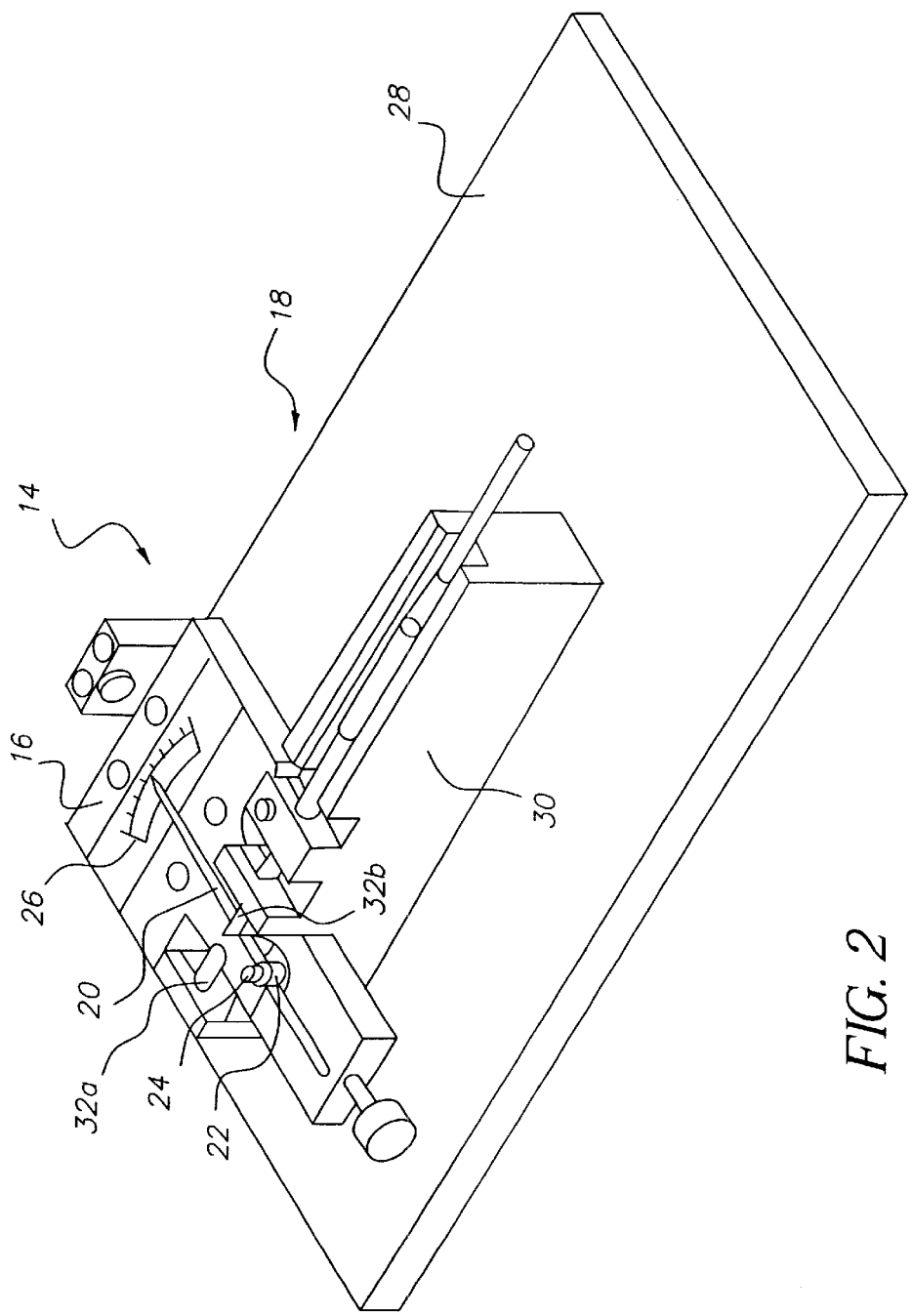
FIG. 2 is another prior art apparatus of the type shown in FIG. 1.
Figure 3:
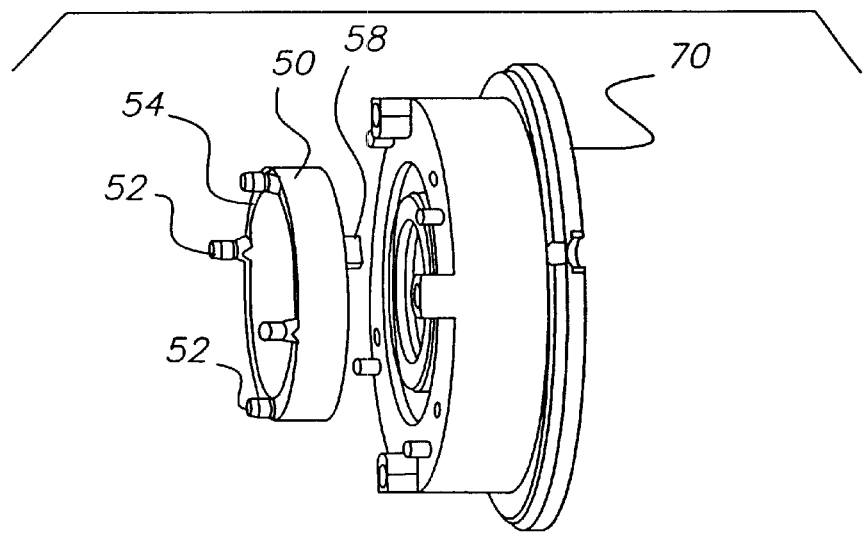
FIG. 3 is a perspective view of a magnetic rotor and partial electromagnetic shutter actuator.
Figure 4:
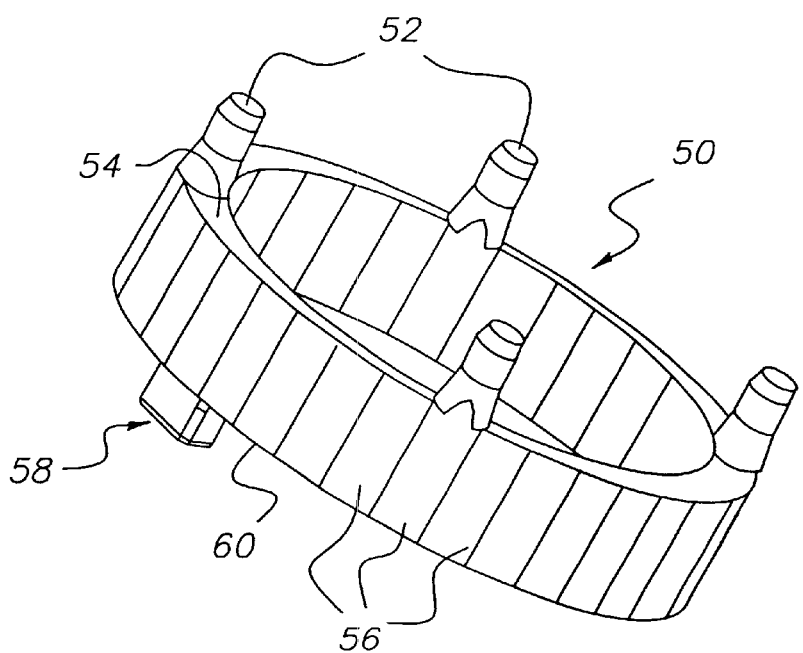
FIG. 4 is a perspective view of the magnetic rotor having a plurality of magnetic poles and a plurality of physical features.

Turning now to the drawings, and in particular to FIGS. 3–4, magnetic properties of a complex magnetic element, such as magnetic rotor 50 for driving an electromagnetic shutter 70, may be measured with magnetic test apparatus 100 (described fully below) of the invention. Magnetic rotor 50, having a generally cylindrically shape, has a plurality of outwardly extending physical features or posts 52 spatially separated and arranged along a first peripheral edge 54. According to FIG. 4, a plurality of magnetic poles 56 is arranged about the circumference of magnetic rotor 50. Further, an outwardly extending stop tab 58 is arranged on a second peripheral edge 60 of the magnetic rotor 50 preferably opposite the plurality of outwardly extending physical features 52.

Generally cylindrical magnetic rotors 50 magnetized with a plurality of magnetic poles 56, for instance 36 or more, are used in applications such as magnetic zoom/shutters 70, as shown in FIG. 3.

Referring again to FIG. 3, what makes applications of magnetic rotor 50 so complex is that in addition to the multiple closely spaced magnetic poles 56, these magnetic rotors 50 require additional physical features 52 (such as posts) and a tab 58 that must maintain proximity to the magnetic poles 56. For example, the magnetic rotor 50 depicted in FIG. 3 has four (4) posts or physical features 52 located 90 degrees apart on the top peripheral edge 54 of the cylinder and one tab 58 located on the bottom peripheral edge 60 of the cylinder.

Figure 5:
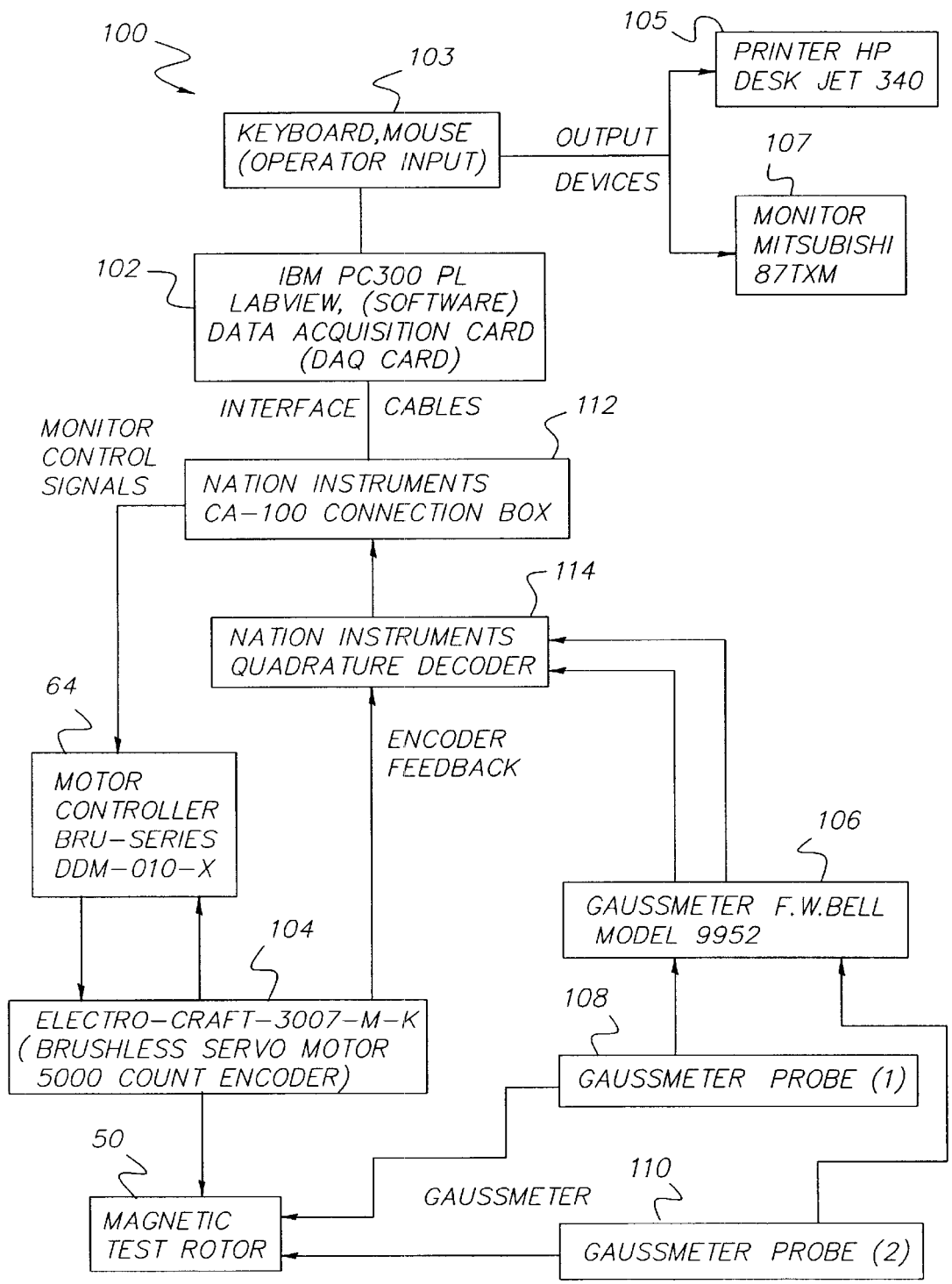
FIG. 5 is a schematic diagram of a preferred embodiment of the measurement apparatus of the invention.

Referring to FIG. 5, to achieve optimum system performance, a unique and unobvious magnetic test apparatus 100 was designed to verify the manufacture and magnetization of complex magnetic rotors 50, as described above. Importantly, magnetic test apparatus 100 simultaneously yields a host of desirable and some unexpected results as described below.

Figure 7:
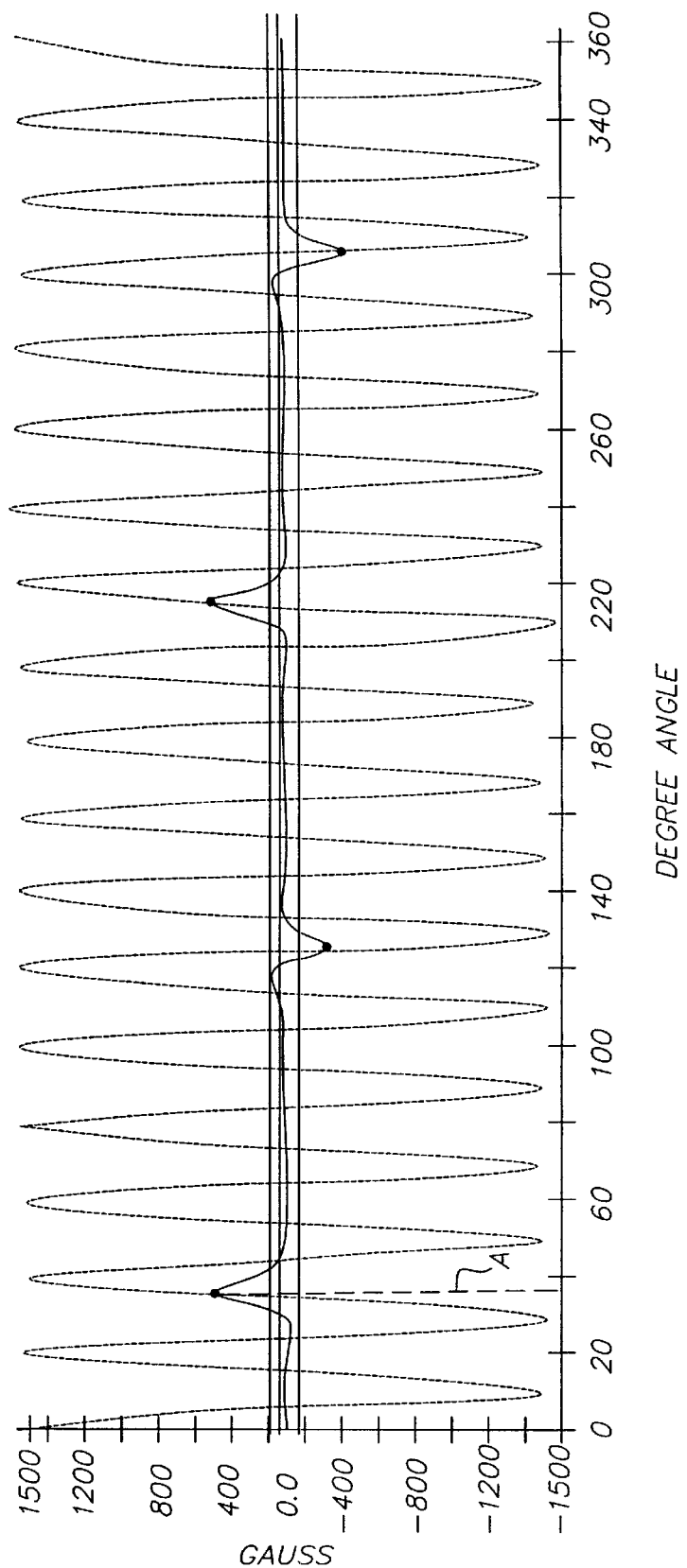
FIG. 7 is an output display graph of results produced by the apparatus of the invention for an "acceptable" magnetic element.
Figure 8:
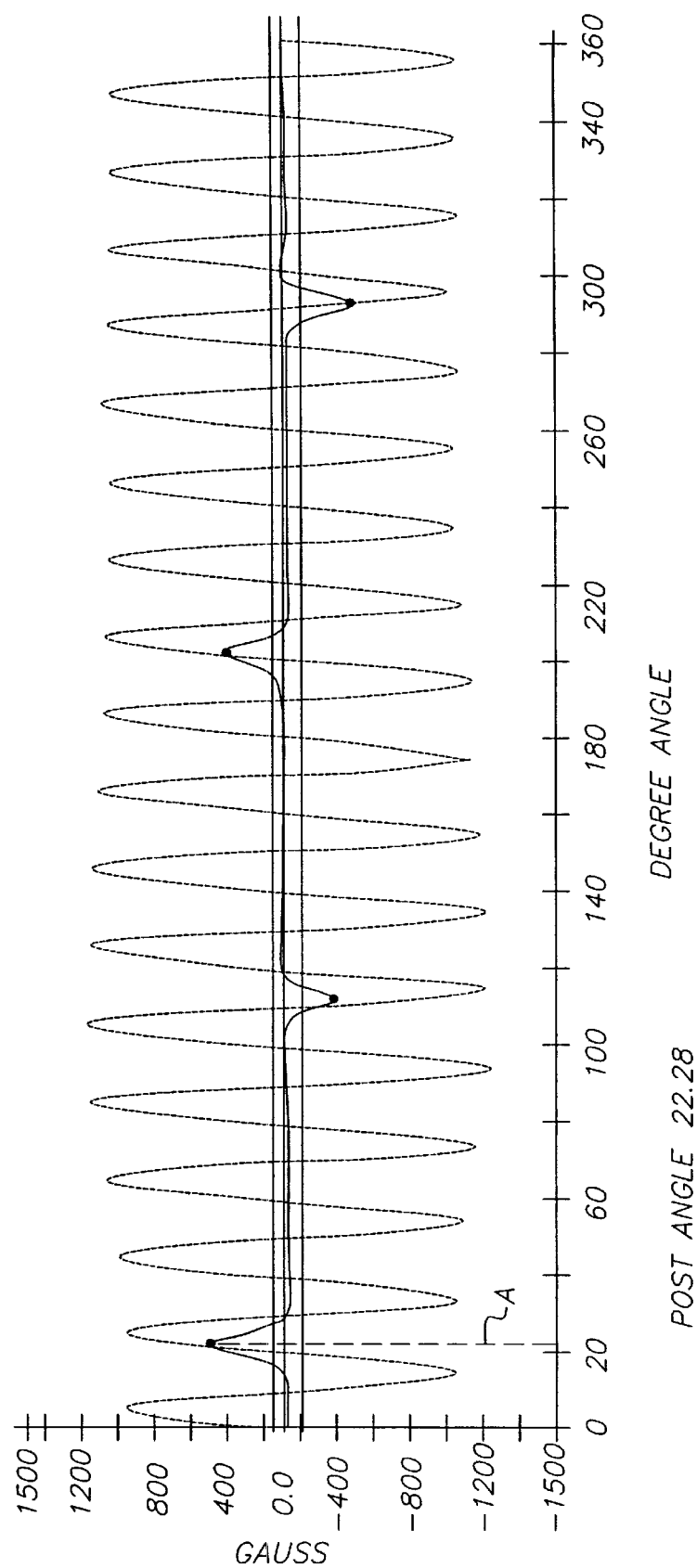
FIG. 8 is another output display of results produced by the apparatus of the invention for a "rejectable" magnetic element.

According to FIGS. 7 and 8, magnetic test apparatus 100 verifies the manufacture and magnetization of the magnetic poles 56 on magnetic rotor 50 by measuring spatial separation (d) between a predetermined one of a plurality of spaced apart physical features 52 and one of a plurality of magnetic poles 56. As indicated, physical features 52 and magnetic poles 56 are each arranged on a multi-pole magnetic rotor 50 (as described above). As depicted in FIG. 4, each one of the magnetic poles 56 has a fixed angular position relative to a predetermined one of the physical features 52.

Referring again to FIG. 5, magnetic test apparatus 100, broadly defined, includes motor/encoder means 104 for rotating the magnetic rotor 50 so as to continuously expose each one of the plurality of magnetic poles 56 and each one of the physical features 52 to a measurement of magnetic flux. A rotatable fixture (not shown) is provided to mount magnetic rotor 50 for rotation. In the preferred embodiment, means 104 for rotating magnetic rotor 50 is a DC motor drive coupled with a 5000 line graduated encoder means (described below).

The motor/encoder is preferably a Model H3007 made by Electro-Craft located in Eden Prairie, Minn. is used to determine the angular position of each one of the magnetic poles 56 relative to a predetermined one of the plurality of physical features 52. The angular position defines the location of a predetermined physical feature 52 relative to the predetermined magnetization pattern of the magnetic element as defined by the pairs of magnetic poles 56.

Operably connected to the motor/encoder means 104 is a Gaussmeter 106 that provides the means for measuring magnetic flux. Gaussmeter 106, preferably one made by F. W. Bell Co., located in Orlando, Fla., has dual Hall effect probes 108, 110. In the preferred embodiment, first Hall effect probe 108 is used for measuring a first magnetic flux value associated with each one of the magnetic poles 56. Second Hall effect probe 110, in the preferred embodiment, is used for measuring a second magnetic flux value associated with each one of the plurality of physical features 52. For analytical purposes, the first magnetic flux value, second magnetic flux value and angular position collectively define a data array.

Further, a data controller 102 for acquiring and then analyzing the data array connects with all of the components of the magnetic test apparatus 100, as shown in FIG. 5. We prefer for convenience using an IBM PC 300 PL as the data controller means. A DAQ card installed in PC 102 is used to capture the various data. LabView™ software with proprietary algorithm linked to the PC 102 provides the angular position of each point, magnetic flux values of the magnetic poles 56 and the physical features 52 of the complex magnetic part 40, and is drawn graphically. A personal computer interface (PCE) compatible DAQ (data acquisition) card is used to acquire and capture data.

A quadrature decoder 114 connected to motor/encoder means 104 (shown in FIG. 5) that produces 20,000 pulses per revolution is used to trigger the data controller 102. We prefer a quadrature decoder 114 model no. LS 7083 made by LSI Computer System, Incorporated of Melville, N.Y. This chip is preferred because of its compatibility with the other components of the invention. The quadrature decoder is connected to the data controller 102 via a connector box 112, preferably a Nations Instruments CA-100 connection box.

The measurement process begins with placing the magnetic rotor 50 on a rotatable fixture or spindle (not shown). As shown in FIG. 4, The tab 58 of the magnetic rotor 50 is used to establish and approximate the rotational position of magnetic rotor 50. The motor/encoder means 104 is instructed to begin rotation. The data controller 102 is initiated with the quadrature index pulses. Each time a pulse is generated data is collected and stored. The magnetic rotor 50 is over-sampled, i.e., repeat sampled for verification, through one and a quarter revolution. The data array is searched for the first positive going zero cross-over, i.e., first change in polarity between adjacent magnetic poles, after one of the plurality of physical features or post 52 location has been determined by the second Hall probe 110. Twenty thousand data points representing one full revolution of magnetic rotor 50 is stored beginning from the first zero cross-over.

A commercial software package, BRU Master 64 made by Electro-Craft is used for motor parameter control. BRU Master was selected because of its convenience and it has a complete set of easy to understand windows available from its pull down menus. Moreover, the BRU Master package provides indexing functionality that is important to our magnetic test apparatus 100. Importantly, the BRU Master 64 package enables the magnetic rotor so to be mounted on the spindle without requiring precision alignment, thus avoiding costly tooling and additional labor to do the initial alignment. The magnetic field measurements are relative to the positions of the magnetic poles 56. Since data is triggered by the motor/encoder means 104, the angular position of each magnetic pole 56 is easily determined. The data array contains three data sets (relative angular position of each point, magnetic pole flux density, and post flux density). The array is processed for each measurement requirement. The program displays a pass/fail screen, as well as detailed graphs and data parameters. The program is also required to accept calibration parameters. By using this simple, inexpensive, and easily manufacturable magnetic test apparatus 100, all measurement requirements are done in a few minutes, moreover, it is ideal for the large-scale selection of multipole complex shape magnets 50 for mass production. requiring precision alignment, thus avoiding costly tooling and additional labor to do the initial alignment. The magnetic field measurements are relative to the positions of the magnetic poles 56. Since data is triggered by the encoder means 112, the angular position of each magnetic pole 56 is easily determined. The data array contains three data sets (relative angular position of each point, magnetic pole flux density, and post flux density). The array is processed for each measurement requirement. The program displays a pass/fail screen, as well as detailed graphs and data parameters. The program is also required to accept calibration parameters. By using this simple, inexpensive, and easily manufacturable magnetic test apparatus 100, all measurement requirements are done in a few minutes, moreover, it is ideal for the large-scale selection of multipole complex shape magnets 50 for mass production.

Figure 6:
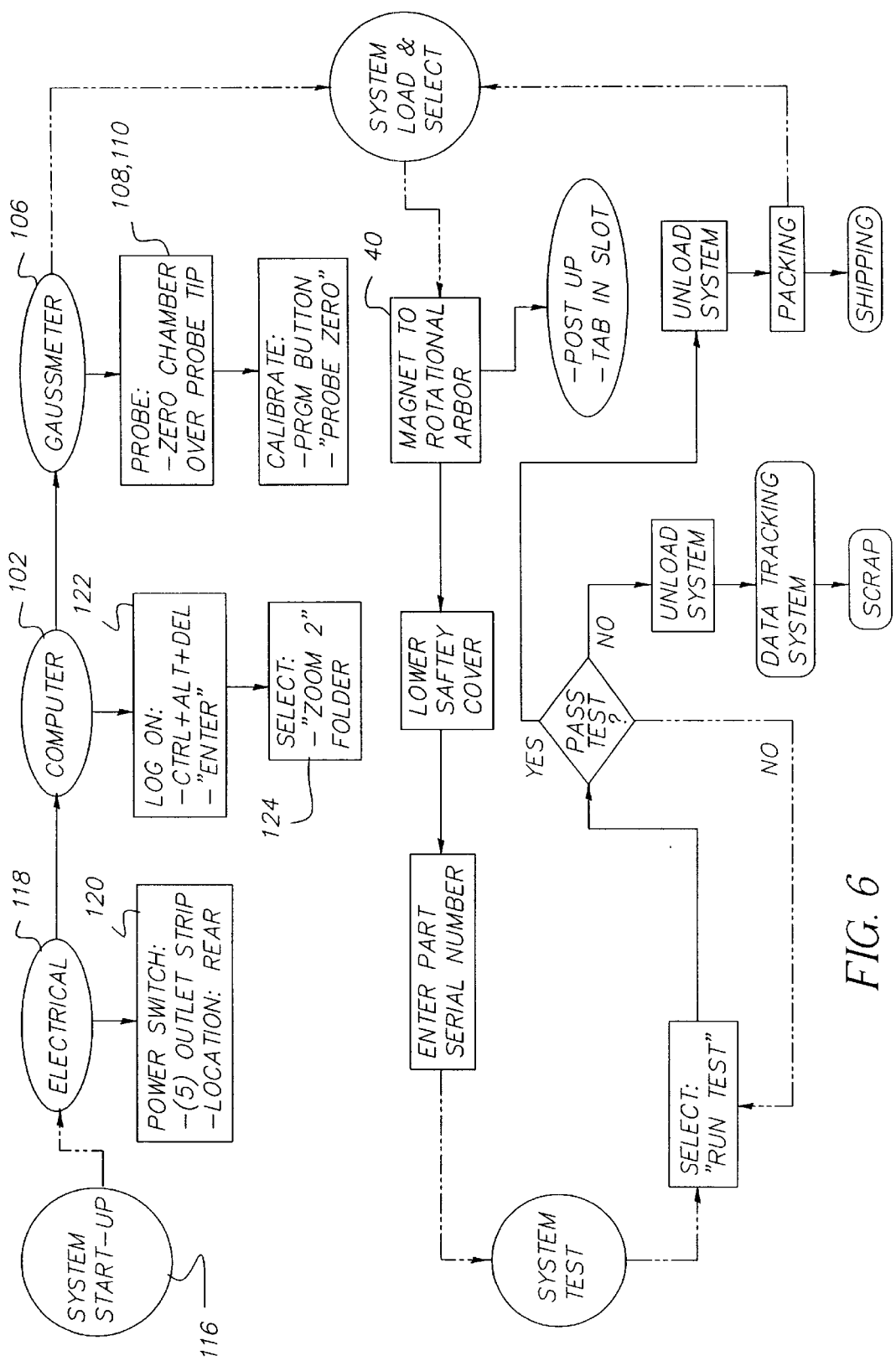
FIG. 6 is a schematic diagram of the operational sequence of the apparatus of the invention used for testing complex magnetic elements.

Turning to FIG. 6, the operational sequence for testing a complex magnet 50 with the magnetic test apparatus 100 of the invention is illustrated. As indicated, once the magnetic element or magnetic rotor 50 is mounted for testing and rotation, an arbor (not shown) is directed to rotate the magnetic rotor 50 vis-a-vis' system start-up sequence 116, 118, 120. Computer 102 initiates the test (via process 122, 124) by causing the rotation of the magnetic element and receives signals from Gaussmeter 106 indicating magnetic flux values from either of probes 108 and 110. These magnetic flux values are then stored in computer 102 for later processing. Computer 102 is then programmed by making unput via keyboard 103 to retrieve and analyze data and display (via monitor 107 or printer 105) either a pass or fail decision for the magnetic element 50 under test.

Example of Magnetic Rotor Test

Referring to FIGS. 7 and 8, the magnetic test apparatus 100 of the invention was used to test several complex magnetic rotors 50. Apparatus 100 simultaneously measures the magnetic flux of the magnetic poles 56 and physical features 52 of the multipole magnetic rotor 50. An analysis of the signals generated, as discussed above, provides data for accepting or rejecting the magnetic rotor 50 being tested. According to FIGS. 7 and 8, the magnitude (denoted by the heights of the peaks) of the magnetic fields (in gauss) is displayed at any one of the positive and negative magnetic poles 56 and at physical features 52. This data is then compared with a computer modeled prediction or a preferred magnetization pattern. According to FIG. 7, an acceptable tested magnetic rotor 50 tested with the apparatus 100 of the invention is illustrated. Based upon the magnitude and uniformity of the peaks and the calculated value of a predetermined physical feature 52, the graph display confirms that the test results of the magnetic rotor 50 meets all the predetermined test specifications.

With respect to FIG. 8, a graph of a rejected magnetic rotor 50 is illustrated. According to the operations of our test apparatus 100, the graph displays non-uniform magnitudes of the magnetic poles 56. Moreover, the resulting post angle (denoted by A and determined from the graphical display) of the predetermined physical 52 does not meet the predetermined test specification.

The invention has, therefore, been described with reference to a preferred embodiment. It will be appreciated, however, that variations and modifications can be effected by a person of ordinary skill in the art without departing from the scope of the invention.

Parts List
1 prior art apparatus
2 gap region
2a tapered pole tip
3 gap region
4 field sensor
5 gaussmeter
6 first angular meter device
7 first needle pointer
8 first support member
9 pivot axis
10 marked scale
11 ferromagnetic core
12 frame
14 second prior art apparatus
16 second angular meter device
18 stationary member
20 second needle pointer
22 second support member
24 second pivot axis
26 marked scale
28 base
30 support structure
32a ferromagnetic pole
32b ferromagnetic pole
40 miniature bipolar magnet
40a north pole of magnet 40
50 magnetic rotor
52 outwardly extending physical features, or posts, on rotor 50
54 first peripheral edge of rotor 50
56 magnetic poles
Parts List—Continued
58 outwardly extending stop tab
60 second peripheral edge of rotor 50
64 BRU Master motor controller
70 shutter body
100 magnetic test apparatus
102 data controller (PC)
103 keyboard
104 (motor drive) means for rotating the magnetic rotor 50
105 printer
106 gaussmeter
107 monitor
108 first Hall effect probe of gaussmeter 106
110 second Hall effect probe of gaussmeter 106
112 encoder means
114 quadrature decoder
116 system startup
118 system startup
120 system startup
122 system test
124 system test

What is claimed is:

1. A system for verifying the location of each one of a plurality of physical features relative to magnetic poles arranged on a complex magnetic element having a fixed reference feature thereon, said system comprising:

means for rotating the complex magnetic element so as to continuously expose each one of salt magnetic poles and each one of said physical features for a measurement of magnetic flux;

means for measuring magnetic flux positioned proximate to said complex magnetic element, said means for measuring comprising a first probe for generating a plurality of first signals each one of which corresponds to a first magnetic flux value associated with each one of said magnetic poles, and a second probe for generating a plurality of second signals each one of which corresponds to a second magnetic flux value associated with each one of said plurality of physical features;

encoder means operably connected to said means for rotating, said encoder means generating a third signal corresponding to an angular position of said magnetic element relative to said fixed reference feature in response to said first and second signals from said first and second probes, and wherein said encoder means enabling an association of said magnetic poles with said physical features, a data controller for acquiring and then analyzing said first-, second- and third signals corresponding to said first magnetic flux values, said second magnetic flux values, and said angular positions, respectively; and wherein said angular position, first magnetic flux values and said second magnetic flux values collectively define a data array.

2. The system recited in claim 1 wherein said means for rotating is a DC motor, and wherein said encoder means operably connected to said DC motor has a 5000 line graduation for rotating said complex magnetic element.

3. The system recited in claim 1 farther comprising a quadrature decoder operably connected between said encoder means and said data controller, said quadrature decoder producing 20,000 pulses corresponding to magnetic flux data points per revolution of said complex magnetic element.

4. The system recited in claim 2 wherein said data controller is a programmed computer.

5. The system recited in claim 4 wherein said programmed computer comprises means for producing displays comprising pass/fail data, graphs and data parameters.

6. The system recited in claim 1 wherein said data controller collects a plurality of data array sets every one and a quarter revolution of said complex magnetic element, and wherein one of said plurality of data array sets defines a specific transition of polarity associated with a predetermined physical feature.

* * * * *